US009433012B2

(12) United States Patent
Gruet et al.

(10) Patent No.: US 9,433,012 B2
(45) Date of Patent: Aug. 30, 2016

(54) METHOD FOR ENABLING RADIOELECTRIC COEXISTENCE BETWEEN TWO PMR DEVICES OF WHICH ONE IS A NARROWBAND TYPE AND THE OTHER IS A BROADBAND TYPE

(75) Inventors: Christophe Gruet, Montigny le Bretonneux (FR); Eric Georgeaux, Montigny le Bretonneux (FR); Xavier Ambroise, Gif sur Yvette (FR)

(73) Assignee: AIRBUS DS SAS, Elancourt (FR)

( * ) Notice: Subject to any disclaimer, the term of this patent is extended or adjusted under 35 U.S.C. 154(b) by 30 days.

(21) Appl. No.: 14/237,414

(22) PCT Filed: Aug. 2, 2012

(86) PCT No.: PCT/EP2012/003290
§ 371 (c)(1),
(2), (4) Date: Feb. 6, 2014

(87) PCT Pub. No.: WO2013/020673
PCT Pub. Date: Feb. 14, 2013

(65) Prior Publication Data
US 2014/0185574 A1 Jul. 3, 2014

(30) Foreign Application Priority Data
Aug. 9, 2011 (FR) ...................................... 11 02495

(51) Int. Cl.
*H04W 4/00* (2009.01)
*H04W 72/12* (2009.01)
*H04W 16/14* (2009.01)

(52) U.S. Cl.
CPC ......... *H04W 72/1215* (2013.01); *H04W 16/14* (2013.01)

(58) Field of Classification Search
None
See application file for complete search history.

(56) References Cited

U.S. PATENT DOCUMENTS 8,335,206 B1 * 12/2012 Hirsch et al. ................. 370/350
8,520,586 B1 * 8/2013 Husted et al. ................ 370/318
(Continued)

FOREIGN PATENT DOCUMENTS

WO 2011/072884 6/2011

OTHER PUBLICATIONS

International Search Report and Written Opinion for Int. App. No. PCT/EP2012/003290, mailed Sep. 24, 2012.
(Continued)

*Primary Examiner* — Otis L Thompson, Jr.
(74) *Attorney, Agent, or Firm* — Pillsbury Winthrop Shaw Pittman LLP

(57) ABSTRACT

The present invention relates to a method for enabling radioelectric coexistence between two devices based on personal mobile radio or PMR technology, of which one is a narrow band device and the other is a broadband device, and each device interacts via a radioelectric link with respective base stations connected to a control unit for the radio resource of their respective networks, characterized in that it comprises the following steps:
- detection of the presence of a narrow band radioelectric emitter device in the vicinity of device,
- transmission of a message on the broadband network, addressed to the control unit, which message signals the presence of a possible narrow band emitter close to said device, and
- assignment by the control unit of new frequency blocks for uplinks, only in predefined allocated periods.

15 Claims, 3 Drawing Sheets

(56) References Cited

U.S. PATENT DOCUMENTS

| | | |
|---|---|---|
| 2009/0135767 A1 | 5/2009 | Silk et al. |
| 2013/0122811 A1* | 5/2013 | Scribano et al. ............ 455/41.2 |
| 2013/0183904 A1* | 7/2013 | Hiben et al. ................ 455/63.1 |
| 2013/0188537 A1* | 7/2013 | Marque-Pucheu et al. .. 370/281 |
| 2014/0064193 A1* | 3/2014 | Yacobi et al. ................ 370/329 |
| 2014/0112320 A1* | 4/2014 | Makhlouf et al. ............ 370/338 |
| 2014/0133530 A1* | 5/2014 | Maguire .................. H04B 1/38 375/219 |
| 2014/0177457 A1* | 6/2014 | Grosspietsch et al. ....... 370/252 |

OTHER PUBLICATIONS

Chiasserini et al. "Coexistence Mechanisms for Interference Mitigation between IEEE 802.11 WLANs and Bluetooth," Proceedings IEEE Infocom 2002. The Conference on Computer Communications, 21st Annual Joint Conference of the IEEE Computer and Communications Societies, New York, NY, Jun. 23-27, 2002; vol. 2, Jun. 23, 2002, pp. 590-598.

* cited by examiner

METHOD FOR ENABLING RADIOELECTRIC COEXISTENCE BETWEEN TWO PMR DEVICES OF WHICH ONE IS A NARROWBAND TYPE AND THE OTHER IS A BROADBAND TYPE

CROSS REFERENCE TO RELATED APPLICATIONS

The present application is a U.S. National Phase Application pursuant to 35 U.S.C. §371 of International Application No. PCT/EP2012/003290 filed Aug. 2, 2012, which claims priority to French Patent Application No. 1102495 filed Aug. 9, 2011. The entire disclosure contents of these applications are herewith incorporated by reference into the present application.

FIELD OF THE INVENTION

The present invention relates to a method for enabling radioelectric coexistence between two PMR devices, of which one is a narrowband type and the other is a broadband type. More particularly, the purpose of the invention is to reduce or even eliminate the radioelectric disturbances or interference caused by the signals transmitted and/or received by a broadband mobile PMR device located close to a narrowband mobile PMR device and vice versa.

BACKGROUND

According to the prior art, in the field of Private Mobile Radio (PMR), the term used generally in the professional community, there exist mobile devices that work with narrow band technology and mobile devices that work with broad band technology.

Devices that work with narrow band technology each use a specific radio frequency for transmitting data. The frequency band used for this type of device must be as small as possible in order to limit interference with the adjacent frequency bands. Known devices in the narrow band PMR category include walkie talkies, CB (citizens' band) radios, or the devices of type TETRA (TErrestrial Trunked RAdio), TETRAPOL (TErrestrial Trunked RAdio POLice), P25 (Project 25).

On the other hand, the broad band technology devices use frequency division multiplexing. In other words, various transmission channels are created and arise from the division of the radiofrequency bandwidth into multiple frequency sub-bands. This technology has the advantage of enabling unrelated data to be transmitted simultaneously. The category of broadband PMR devices includes broadband mobile devices, better known as high speed modems, which use Wireless Fidelity (Wifi) technology, or Universal Mobile Telecommunications System (UMTS), or Long Term Evolution (LTE), or also Worldwide Interoperability for Microwave Access (WiMAX).

At all events, when these narrow band and broadband PMR devices are operated close to each other, the locational coexistence of these PMR devices can quickly cause considerable difficulties, particularly if the minimum isolation between the antennas of these devices is relatively small, for example between 10 and 50 dB depending on the transmission and reception characteristics of the devices in question.

In fact, it has been observed that in such cases the narrow band device suffers interference or disturbances in its receiving channel due to the proximity of the broadband device, and vice versa.

SUMMARY

The purpose of the present invention is to solve all of the drawbacks associated with the prior art. To do this, the invention suggests a method for radioelectric coexistence between two PMR devices, one of the narrow band and the other of the broadband type, according to any of the features described in claim 1.

The invention makes it possible to dispense with the addition of supplementary filtering means by precisely coordinating the transmitting and receiving operations of the narrow band and broadband PMR devices when they are located close to one another.

The object of the invention is therefore a method to enable radioelectric coexistence between two personal or PMR devices working with mobile radio technology, of which one is a narrow band device and the other is a broadband device, in which each device interacts respectively via a radioelectric link with base stations connected to a control unit for the respective radio resource of their networks, characterized in that it comprises the following steps:
- detection of the presence of a narrow band radioelectric emitter in the vicinity of the device,
- transmission of a message on the broadband network, addressed to its control unit, which message reports the presence of a possible narrow band emitter close to said broadband device, and
- assignment of new frequency blocks for the uplinks by the control unit associated with the broadband network only during predefined allocated periods.

The invention also comprises any one of the following features:
- prior to sending a message to the broadband network, an unambiguous indication including information on periods in which transmissions by the broadband device are permitted, determined in the structure of a grid transmitted by the narrow band device;
- the indication of periods in which the broadband device is authorised to transmit is associated with a display of a binary element sequence;
- the indication of periods in which the broadband device is authorised to transmit is associated with a display of a contextual list;
- the grid structure contains a reference number corresponding to the narrow band device's system that detected the proximity of the broadband device;
- determination of the presence of the narrow band device is effected by manual activation on the device (20), by means of a switch;
- determination of the presence of the narrow band device is effected by configuration in a configuration menu of the broadband device;
- determination of the presence of the narrow band device is effected by receipt of an electric signal via sensors or instruments associated with the broadband device;
- this determination based on receipt of an electric signal is carried out by automatic detection of narrow band carriers that are located in the vicinity of the broadband device while the narrow band device in question is in a transmitting phase;
- automatic detection of narrow band carriers is performed by continuous measurement of the power level of such carriers;
- this determination by reception of an electric signal is performed by transmission of specific messages between the narrow band device and the broadband device which they are located close to one another;

to carry out this transmission of messages, the respective narrow band and broadband devices use the WPAN/WLAN technology;

the exchange of messages between the narrow band and broad band devices has a relatively long broadcast periodicity compared with the time taken to emit the messages;

broadcast power level of these messages is relatively low.

A further object of the invention is a system of radioelectric coexistence between two personal or PMR mobile technology devices, of which one is a narrowband type device and the other is a broadband type device, and each device interacts respectively via a radioelectric link with base stations connected to a control unit for the respective radio resource of their network, characterized in that this system is capable of implementing the method according to any of the preceding characteristics.

BRIEF DESCRIPTION OF THE FIGURES

The invention will be better understood after reading the following description and reviewing the accompanying figures. The figures are presented solely for illustrative purposes and are not limiting of the invention in any way. The figures show.

DETAILED DESCRIPTION

It should be noted that the figures are not to scale.

The following outcomes are exemplary. Although the description refers to one or more embodiments, this does not necessarily mean that each reference refers to the same embodiment, or that the features apply only to one embodiment. Single features from different embodiments may also be combined to yield other outcomes.

Figure 1:
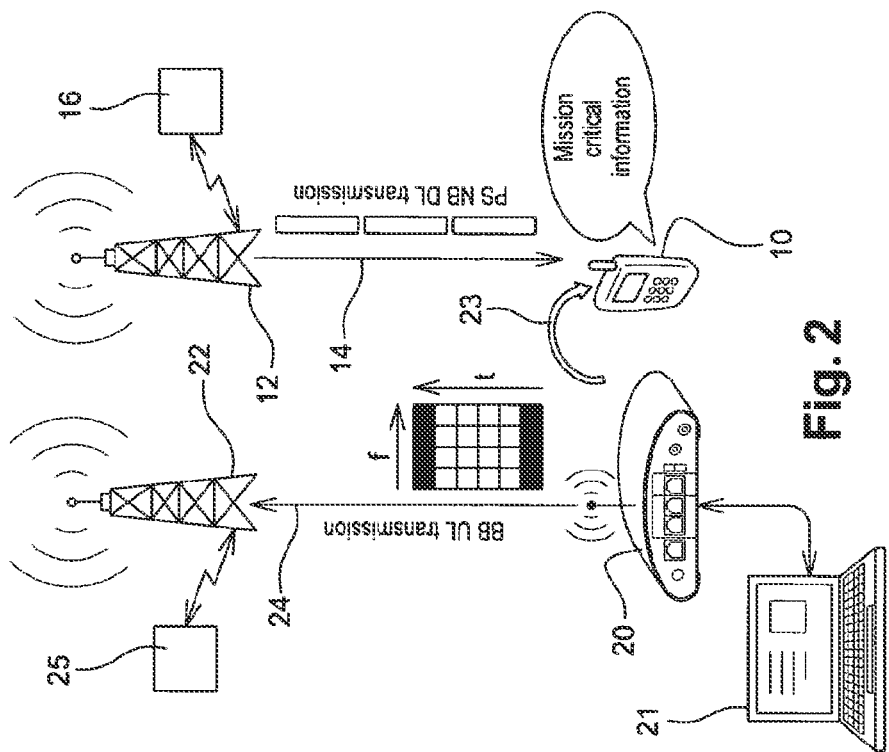
FIG. 1: A diagrammatic representation of the narrow band and broadband devices according to the state of the art.

FIG. 1 is an illustration of an example according to the prior art in which a narrow band PMR (or Private Mobile Radio) device 10 and a broadband PMR device 20 are in close proximity to one another.

In one of the most common usage scenarios, an authorised user (not shown) such as a law enforcement agent, a fireman or similar, is carrying a narrow band PMR device 10. This PMR device 10 PMR may be for example a CB (citizens' band) radio, a walkie talkie or a mobile telephone on a GSM network. This authorized user has an official or rescue vehicle, and the vehicle is fitted with device 20. Device 20 is a modem that has been configured to transmit and/or receive data via radioelectric waves. Such a device 20 installed in the vehicle enables the authorised user to connect to remote databases on a server or a central system (not shown) via a terminal 21, a laptop computer for example, so that he is able to consult secure data.

The term secure data is understood to mean stolen vehicles, an identity of an individual being interviewed, validity or otherwise of a driving license, and so on.

Device 20 is capable of communicating with the central server connected to the broadband network via radioelectric waves through one or more base station(s) 22.

To ensure that the radioelectric link between terminal 21 and the broadband network is of sufficient quality, the operator of the broadband radiomobile network has set up a series of base stations 22 throughout the region to be covered so that device 20 is always within the radioelectric coverage area of one or other of these base stations. Each base station 22 is connected to a control unit 25 for the radio resource of the broadband network.

In the same way, in order to ensure that the radioelectric link between device 10 and the narrow band network is of sufficient quality, the operator of the narrow band radiomobile network has set up a series of base stations 12 throughout the territory to be covered so that device 10 is always within the radioelectric coverage area of one of these base stations, Each base station 12 is connected to a control unit 16 for the radio resource of the narrow band network.

At all events, when the user who is equipped with device 10 is in the passenger compartment of his vehicle and device 20 is in a data transmission phase 24, it becomes evident that device 10 is experiencing interference 23 or disturbances on its receiving channel. These disturbances are caused by the proximity of device 10 to device 20, which is installed and remains inside the vehicle. This disturbance also occurs on device 20 when device 10 is in transmission phase.

In principle, it is assumed that devices 10 and 20 are very close when there are less than 10 dB of isolation between the two devices 10, 20. In addition, their mutual interference 23 or disturbance may result in a significant loss of performance of both devices 10, 20.

Accordingly, in the interests of ensuring that the public safety organisation functions optimally, it is most important to ensure that narrow band device 10, which is predominantly used to exchange sensitive and/or essential information by voice during a mission, is not affected or obstructed by broadband device 20.

In fact, when broadband device 20 is in a data transmission phase, it is noted for example that on receiving channel 14 of narrow band device 10:

firstly, there is a presence of noise 23 due to a leak from the transmission channel of device 20. The level of this noise 23 depends on the separation frequency between the transmitting carrier of device 20 and the receiving carrier of device 10, as well as the isolation between the two devices 10, 20;

secondly, there is a presence of noise 23 due to imperfections in the receiving filter of device 10. The level of this noise depends on the power of the transmitting carrier of device 20 and the characteristics of the receiving filter of device 10, as well as the isolation between the two devices 10, 20.

In the same way, when narrow band device 10 is in a data transmission phase it is observed that on the receiving channel of broadband device 20:

firstly, there is a presence of noise due to a leak from the transmission channel of device 10. The level of this noise depends on the separation frequency between the transmitting carrier of device 10 and the receiving carrier of device 20, as well as the isolation between the two devices 10, 20;

secondly, there is a presence of noise due to imperfections in the receiving filter of device 20. The level of this noise depends on the power of the transmitting carrier of device 10 and the characteristics of the receiving filter of device 20, as well as the isolation between the two devices 10, 20.

Any possible disturbances due to the coexistence of a device 10 in close proximity to another device 10, or the coexistence of a device 20 in close proximity to another device 20, will not be considered.

In fact, such technological disturbances can be avoided, since device 10 functions in half-duplex mode, in other words the bidirectional communication channel on which the data is transmitted is not active simultaneously in both directions, but is offset temporally. Moreover, device 20 may be configured in HD-FDD mode (Half-Duplex Frequency Division Duplex), in other words, the communication path uses a frequency half-duplex by frequency in which the uplink path and the downlink path are not only separated by frequency but are also offset temporally.

Consequently, there is a need to reduce or indeed eliminate the technological disturbances 23 that are provoked in device 10 by device 20 and vice versa.

In general, in order to achieve this reduction or elimination of technological disturbances or interference 23, it is common practice to add a filter not only to the transmitting channel but also to the receiving channel of each device 10 and 20.

In addition, filtering requirements are generally dependent on the separation frequency between devices 10 and 20. In other words, the larger the separation frequency spectrum, the easier it is to install the filter.

However, when the frequency spectrum of the narrow band network is too close to the frequency spectrum of the broadband network, filtering essentially becomes impossible for practical purposes.

The following case illustrates the problem perfectly. Assume a first narrow band network, defined on a frequency band of 10 MHz. This 10 MHz frequency band is spread over a frequency spectrum from 380 MHz to 385 MHz for the transmitting channel and a frequency spectrum from 390 MHz to 395 MHz for the receiving channel. Assume a second, broadband network of 2 MHz, coupled to the first network and adjacent to it. This second network is located on a frequency spectrum from 385 MHz to 387 MHz for the uplink channel and a frequency spectrum from 395 MHz to 397 MHz for the downlink channel. In such a case it is observed that the filtering means for each device 10 and 20 mean that the respective filtering masks have to be aligned in order to reach a sufficiently large value, that is to say between 70 dB and 100 dB, of the protection filter, when devices 10 and 20 are in close proximity to one another. Such filtering conditions are theoretically possible, but are still difficult to implement practice for mobile devices 10, 20.

Figure 2:
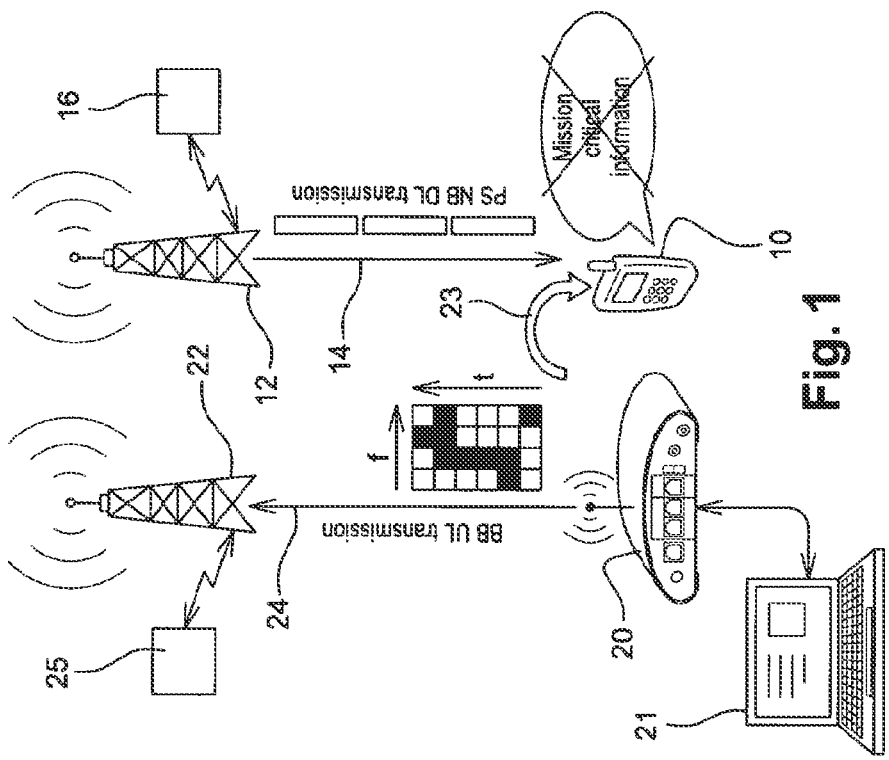
FIG. 2: A diagrammatic representation of the narrow band and broadband devices according to first embodiment of the invention.

According to one embodiment of the invention, shown in FIG. 2, it is possible to reduce the disturbances 23 that device 20 exerts on device 10 and vice versa. This reduction in disturbances 23 according to the invention may be carried out without having to make any structural changes to devices 10 and 20, but by causing the control unit of device 20 to implement a method according to the invention.

Figure 4:
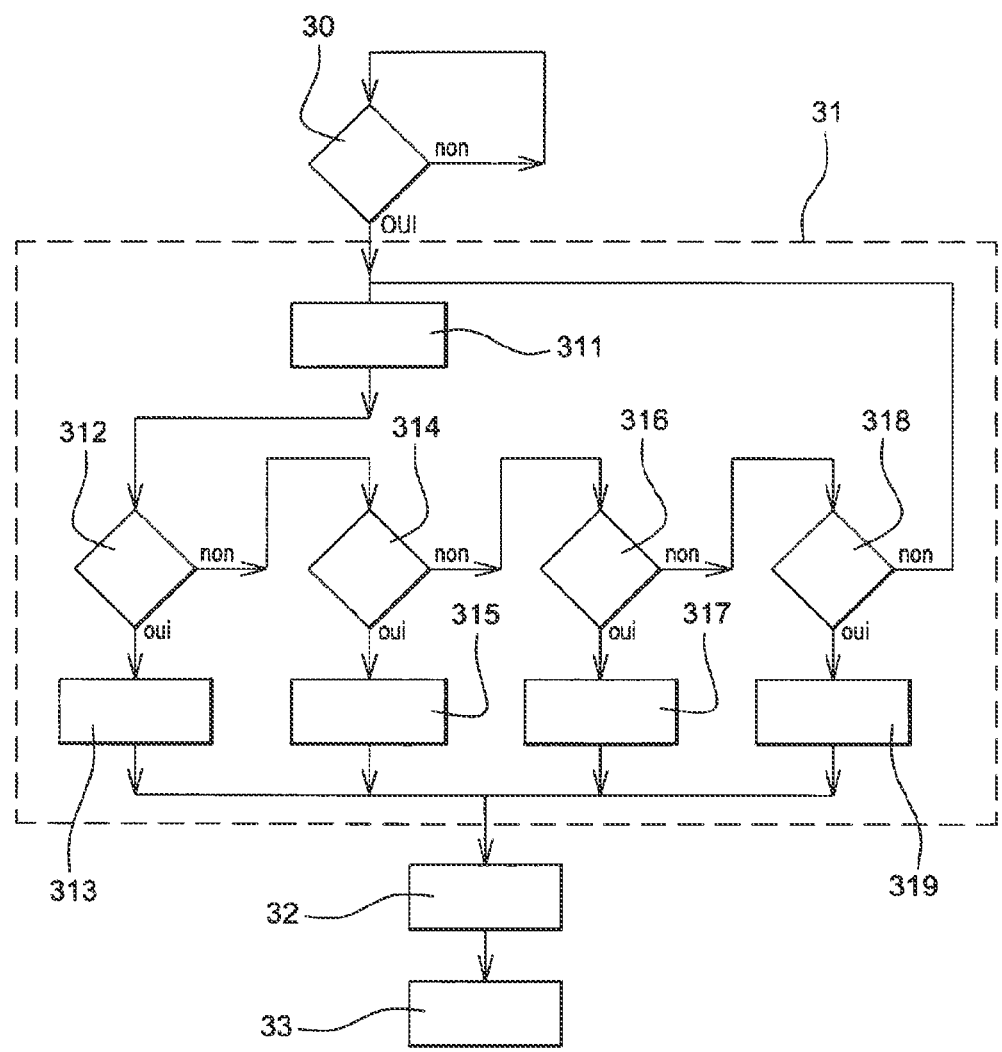
FIG. 4: A function diagram of the method according to an embodiment of the invention.

Such a control unit is known to one skilled in the art and is not the object of our invention. It therefore serves no purpose to describe this control unit in greater detail. At all events, the actions carried out by the control unit of device 20 are ordered by a microprocessor (not shown). In response to instruction codes stored in a program memory (not shown), this microprocessor produces commands designed to implement the method according to the invention as well as the various elements associated with this control unit. For this purpose, the program memory includes several program zones, each of which corresponds to a sequence of steps. FIG. 4 is an example of a function diagram of the method according to the invention.

In a preliminary step 30, the control unit of device 20 determines or detects whether a device 10 using narrow band technology is present anywhere in its vicinity. In a first embodiment of the invention, this determination of the presence of device 10 is performed in response to manual activation initiated by a user of device 20 who presses a switch or makes a corresponding configuration in a configuration menu of device 20.

In another embodiment of the invention, this determination step 30 is performed when an electrical signal is received by the control unit of device 20 by means of associated sensors or elements (not shown). In fact, the signal may be received by one of the sensors associated with the control unit of device 20 after a presence is detected by mechanical or electrical means, for example by electrical engagement of device 10 on the same base as that of device 20, in order to recharge it. In another embodiment, the presence of device 10 is determined through detection of the acoustic activity of the two devices when they use, for example, the same audio interface, such as the vehicle's loudspeakers.

In another embodiment, this determination according to step 30 is carried out by automatic detection of a narrow band carrier in close proximity to broadband device 20 while this device 10 is in a transmission phase. In fact, the power level of the predefined narrow band carriers may be measured continuously in order to detect the presence of a narrow band emitter at close range.

In another embodiment, specific messages 15 are exchanged respectively between the narrow band device 10 and the broadband device 20 when they are located close to one another. In order to carry out this transmission of messages 15, devices 10 and 20 use Wireless Personal Area Network/Wireless Local Area Network (WPAN/WLAN) technology. The term WPAN/WLAN covers networks of type Bluetooth, Wifi, Wimax and ZigBee, but is also generalised to include all of the wireless standards used to reduce transmission power locally.

In fact device 10 periodically broadcasts small messages 15 at a predefined power level. These small messages 15 broadcast by device 10 enable it to signal its presence to device 20. The periodicity of such a broadcast must be quite long compared with the duration of the messages. This broadcast periodicity thus enables the energy consumption of narrow band device 10 not to be affected. The broadcast power level of these messages 15 must also be relatively low. The power level is selected according to the sensitivity of the broadband receiver and the free space propagation for the frequency used to transmit messages 15 so as to limit radioelectric coverage to a few metres or tens of metres. This choice of power level is implemented partly to reduce the energy consumption of device 10, but also to ensure that the detection performed by device 20 has indeed only been performed for narrow band devices 10 that are in close proximity to it.

In a step 32, when the control unit of device 20 has detected the presence of device 10, the control unit then transmits a message on the broadband network, signaling the presence of a potential narrow band radio emitter close to device 20. This message is sent by device 20 to a network control unit 25 that delegates management of the broadband radio resource. For LTE technology for example, this control unit 25 is co-located with base station 22, and the message is sent in the Radio Resource Control (RRC) protocol layer, and controls the part of the radio resources of broadband device 20. The effect of this is to modify the behaviour of the radio sequencer of device 20, particularly for uplinks. In fact, when a narrow band device 10 is detected in the vicinity of device 20, in a step 33 a control unit (not shown) for entity 25 reallocates the frequency blocks for the uplinks used by device 20, but only in the predefined allotted periods lasting X milliseconds, each being separated by millisecond delta. This delta parameter serves to ensure that there is a cyclic relationship between the transmitting period and the non-transmitting period. The delta parameter is chosen according to the interoperability of the two devices 10, 20. In the case of UMTS Terrestrial Radio Access Network (UTRAN), the duration of X is 1 ms. These transmission periods of 1 ms correspond to the duration of subframes, assuming that device 20 is of the type Evolved Universal Terrestrial Radio Access (E-UTRA), depending on a delta parameter. This delta parameter may for example have a value of 5 ms, 10 ms, 15 ms, 20 ms or more. The delta parameter depends on how close device 10 and device 20 are. The delta value is configured directly using broadband device 20 and is entirely dependent on the method according to an embodiment of the invention.

In this way, all uplink frequency blocks available to broadband device 20 may be attributed to a single user during each allocated 1 ms transmission period. In other words, the reduction in time available for the transmission is compensated for with a local increase in the number of frequency blocks attributed.

There is no specific rule applied regarding the downlinks for device 20. However, in order to reduce the disturbances that might be caused for device 20 by the radioelectric transmissions from device 10, the modulation and coding scheme (MCS) for the downlink must be reinforced systematically by control unit 25, thereby overprotecting it with regard to what happens for broadband device 20 in terms of the channel quality indication (CQI) for the transmission channel.

In an improved embodiment of the invention, an intermediate step 31 is interposed, in which device 20 sends an advance message to the broadband network to determine an explicit reference in the structure of a frame that has been transmitted by narrow band device 10. This reference in the frame structure comprises periods in which broadband device 20 is authorised to transmit. In a preferred embodiment of the invention, this frame structure reference may be associated either with a transmission of a binary element sequence or a transmission of a contextual list, thus enabling the user to verify the availability of the bandwidth when he wishes.

Thus, in a step 311 the control unit of device 20 determines the receiving and transmitting status on the narrow band network of device 10 every time this status changes. This receipt of the status of device 10 by device 20 is performed with the aid of the WPAN/WLAN local network interface. Message 15 that contains the status of narrow band device 10 must be received correctly in order for it to be recognised by broadband device 20.

In a step 312, if the receiving and transmitting status of device 10 is "NARROW_BAND_WAITING_SYNCHRO", this indicates that narrow band device 10 is attempting to synchronise itself with the base station 12 that is associated with the narrow band network. In this case, in a step 313 broadband device 20 is authorised to transmit data with a greater or lower restriction level. In other words, transmission of data by device 20 is authorised for periods of 1 ms during each delta, where delta is equal to a value of 5 or 10 ms.

In a step 314, if the status of device 10 is "NARROW_BAND_SYNCHRONIZED_INACTIVE", this indicates that narrow band device 10 is synchronised with the base station 12 associated with the narrow band network, but receiving of voice/data is not active. In this case, in a step 315, broadband device 20 is authorised to transmit in frequency blocks of 1 ms, with a medium restriction level, corresponding for example to a delta value approximately equal to 10 ms.

In a step 316, if the status of device 10 is "NARROW_BAND_SYNCHRONIZED_ACTIVE", this indicates that narrow band device 10 is synchronised with the base station 12 associated with the narrow band network, and that receiving of voice/data is active. In this case, in a step 317, broadband device 20 is authorised to transmit blocks of 1 ms with a greater or lower restriction level, corresponding for example to a delta value approximately equal to 10 or 20 ms.

In a step 318, if the status of device 10 is "NARROW_BAND_TRANSMITTED", this indicates that narrow band device 10 is currently transmitting to the base station 12 associated with the narrow band network. In this case, in a step 319 broadband device 20 is authorised to transmit without restriction.

It should also be noted that the structure of each frame includes a reference number that corresponds to the narrow band device 10 system that has been detected in the proximity of device 20.

Every time the status of narrow band device 10 changes, in step 32 broadband device 20 automatically transmits this change in status to broadband network control unit 25. This signalling of the change in status of device 10 is assured by transmitting a message in the RRC protocol layer of control unit 25 via device 20, so that this device is able to be reconfigured correctly, most importantly to enable access to the uplinks.

When narrow band device 10 is synchronised, in other words when its status is "NARROW_BAND_SYNCHRONIZED_INACTIVE" or "NARROW_BAND_SYNCHRONIZED_ACTIVE", device 10 transmits the information regarding its own synchronisation to broadband device 20. This transmission is carried out using the capabilities offered by the WPAN/WLAN network.

The objective of this method according to the invention is to implement a kind of pseudo-synchronisation between narrow band device 10 and broadband device 20. This pseudo-synchronisation between these two devices 10 and 20 enables the control unit of broadband device 20 to determine the most appropriate time periods for carrying out any data transmissions.

The precise structure of the information frames that are passed from narrow band device 10 to broadband device 20 depends on the narrow band PMR system that is used. Three narrow band PMR systems have been considered for the implementation of this invention:

TETRAPOL, which uses the Frequency Division Multiple Access (FDMA) technology for access. This technology divides the bandwidth into multiple frequency bands to enable information to be transmitted and/or received, wherein these frequency bands may be of varying widths.

TETRA, which uses the Time Division Multiple Access (TDMA) technology for access. With this technology, time is divided into slices and the slices are allocated to allowing information to be transmitted and/or received. and GSM-R/GSM/GPRS.

But an extension to another narrow band system may also be implemented.

With regard to the TETRAPOL type systems, the FDMA frame structure has the following characteristics:

a frame of 20 ms consisting of 160 symbols, each with a duration of 125 μs. The term symbol refers to a unit of time in the signal that carries one item of information. 8 consecutive synchronisation symbols followed by 152 protected and unprotected transport bit symbols.

In one embodiment, a sequence of binary elements relating to the 160 TETRAPOL symbols is allocated to broadband device 20 in such manner as to indicate whether or not the symbol is able to support a transmission of data performed simultaneously by a broadband device in close proximity. The display of this sequence of binary elements is defined with respect to a marker that switches from state 1 to 0 depending on whether the device can support the transmission or not. It is then possible to map the zones in which the transmission by broadband device 20 is forbidden. This mapping may be carried out by determining the zones during which the synchronisation symbols are displayed or while the group of symbols that support the protected bits is being displayed.

With regard to the TETRA type systems, the TDMA frame structure has the following characteristics:
a multiform structure of 18 TDMA frames, each containing four time slots of 85/6 ms.

In one embodiment, an image based on the 18*4 slots, in other words the 72 time slots of a TETRA multiframe, is assigned to broadband device 20, in such manner as to indicate whether or not the time slot is able to support a simultaneous transmission of data executed by a broadband device 20 located close by. It is possible to map the zones in which broadband transmission is forbidden. This mapping may be carried out by determining the zones during which the slots that are received close to narrow band device 10 are created. Every time narrow band device 10 reselects a new time slot, the display of the binary element sequence must be reiterated on the broadband device 20 located close by.

With regard to the GSM-R/GSM/GPRS type systems, the TDMA frame structure has the following characteristics:
a multiframe structure of 26 TDMA frames, each containing 8 slots of 15/26 ms.

In one embodiment, a binary element sequence based on 26*8 slots, in other words the 72 multiframe time slots of GSM-R, is assigned to broadband device 20 in such manner as to indicate whether or not the time slot is able to support a simultaneous transmission of data by broadband device 20. It is also possible to map these zones in which broadband transmission is forbidden. This mapping may be carried out during the time slots that are received in the vicinity of narrow band device 10. Every time narrow band device 10 reselects a new time slot, the display of the binary element sequence must be reiterated on the broadband device 20 located close by.

In another embodiment, for systems having a TDMA frame structure, in other words TETRA or GSM-R or GSM or GPRS, the control unit of device 20 is capable of displaying the binary element sequence more accurately. In fact, each slot may be duplicated in different segments in order to indicate which subpart of the slot is really usable for the broadband transmission.

It is important to understand that in the context of the invention narrow band device 10 is capable of authorising or forbidding the transmission periods by broadband device 20. In fact, this is determined by the receiving strength of narrow band device 10, based particularly on the signal-to-noise ratio (SNR). If the receiving strength in the downlink is high, the transmissions by broadband device 20 in the vicinity will have relatively less effect on narrow band reception than if the downlink reception strength is low.

Figure 3:
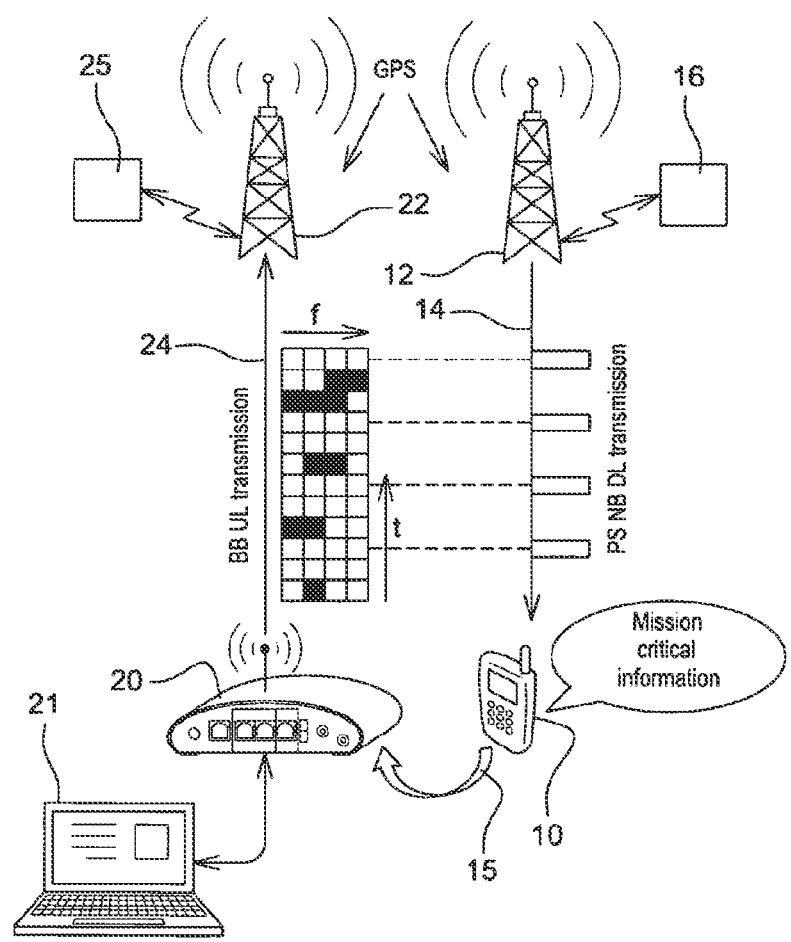
FIG. 3: A schematic representation of the narrow band and broadband devices according to a variant of the invention.

During pseudo-synchronisation of narrow band device 10 with broadband device 20, the device 20 transmits this synchronisation information to broadband network control unit 25. If such is available, broadband device 20 also transmits its own GPS time associated with the pseudo-synchronisation. In fact, in a variation of the invention, as shown in FIG. 3, the narrow band device includes an indication of absolute time. This indication of absolute time is based for example of the GPS associated with the frame transmitted by narrow band device 10. This indication is optional if the broadband and narrow band networks are pseudo-synchronised with one another such that the broadband base station is able to receive the synchronisation frame for devices 10 and 20 perfectly. If the broadband and narrow band networks are not synchronised, such an indication becomes essential for optimising the capabilities of device 20. In this case, if the GPS time is not available to broadband base station 22, device 20 must be able firstly to calculate its own local GPS time and secondly to timestamp the synchronisation frames that are transmitted by device 10 and taken into account by device 20. If such GPS information is not available to devices 10 and 20, a knowledge of the periods in which broad band device 20 is authorised to transmit data may be useful for determining the ratio between these two periods. This ratio value may be used to configure the uplinks for device 20, as an approximate indication of the acceptable broadband transmission relative to which is tolerable in order for it not to be disturbed by the proximity of narrow band device 10.

The information gained from pseudo-synchronising devices 10 and 20 may also be used directly by device 20 to stop the transmission of data based on the synchronisation information, even though a certain uplink transmission has been configured by the broadband network. In this case, broadband device 20 is able to access the GPS time in order to correlate the synchronisation information for narrow band device 10 with the broadband local time base. This will prompt a request for retransmission from the broadband network and will negatively affect the data stream in the uplink on the broadband network. At all events, this will provide maximum protection for the narrow band system. Such behaviour by broadband device 20 may be applied even if the synchronisation information is sent to the broadband network for maximum protection of the reception by narrow band device 10.

The pseudo-synchronisation between devices 10 and 20 is identified at broadband network base station 22, thus enabling base station 22 to modify the parameters of the uplink for device 20. This reconfiguration of broadband device 20 enables the transmission uplink for device 20 to be suppressed or minimised while narrow band device 10 is effectively receiving.

In the case of TETRAPOL, when base stations 12 and 22, which share hosting of the narrow band and broadband networks respectively, are synchronised, the only restriction on the configuration of the broadband network consists in preventing transmission while the synchronisation symbols are being displayed. In fact, this also becomes optional for providing local notification of the synchronisation between devices 10 and 20. Because of the mutual synchronisation of the networks, the periods for which the uplink of device 20 is configured are known in advance.

The invention claimed is:
1. A method for enabling radioelectric coexistence between two devices based on personal mobile radio or Private Mobile Radio (PMR) technology, of which one is a narrow band device and the other is a broadband device, and each device interacts via a radioelectric link with respective base stations connected to corresponding control units for the radio resource of their respective networks, the method comprising:

detecting the presence of a narrow band radioelectric device in the vicinity of the broadband device;

transmitting a message on the broadband network directed to the control unit of the broadband network to indicate the presence of a possible narrow band device close to the broadband device; and assigning, by the control unit of the broadband network, new frequency blocks for uplinks, only in predefined allocated periods.

2. The method according to claim 1, wherein before the message is sent to the broadband network, an explicit indication providing information about the periods in which the transmission of the broadband device is authorized to transmit is determined in the structure of a frame transmitted by the narrow band device.

3. The method according to claim 2, wherein the indication of the periods in which the transmission of broadband device is authorized to transmit is associated with a display of a sequence of binary elements.

4. The method according to claim 2, wherein the indication of the periods in which the transmission of broadband device is authorized to transmit is associated with a display of a contextual list.

5. The method according to claim 2, wherein the structure of the frame comprises a reference number corresponding to the system of the narrow band device that has been detected in the vicinity of the broadband device.

6. The method according to claim 1 wherein determination of the presence of the narrow band device is effected by manual activation at the device via a switch.

7. The method according to claim 1 wherein the determination of the presence of the narrow band device is achieved by a configuration in a configuration menu of device.

8. The method according to claim 1, wherein the determination of the presence of the narrow band device is achieved by reception of an electric signal via sensors or elements associated with the device.

9. The method according to claim 8, wherein the determination is performed by automatic detection of narrow band carriers located close to broadband device while the narrow band device is in a transmission phase.

10. The method according to claim 9, wherein the automatic detection of narrow band frequency carriers is performed by continuous measurement of the power level of said carriers.

11. The method according to claim 8, wherein the determination is performed by a transmission of specific messages between the narrow band device and the broadband device while they are close to one another.

12. The method according to claim 11, wherein in order to carry out this transmission of messages, the narrow band device and the broadband device employ WPAN/WLAN technology.

13. The method according to claim 11, wherein the exchange of messages between the narrow band and broadband devices has a relatively long broadcast periodicity compared with the duration of the transmission of the messages.

14. The method according to claim 13, wherein the power level for the broadcast of the messages is relatively low.

15. A system for assuring radioelectric coexistence between two devices based on personal mobile radio or Private Mobile Radio (PMR) technology, of which one is a narrow band device and the other is a broadband device, and each device interacts via a radioelectric link with respective base stations connected to corresponding control units for the radio resource of their respective networks, wherein said system is configured to implement the method according to claim 1.

* * * * *